US012253830B2

(12) United States Patent
Loetscher

(10) Patent No.: US 12,253,830 B2
(45) Date of Patent: Mar. 18, 2025

(54) TOOL FOR SEPARATING A BACK FROM A MIDDLE OF A TIMEPIECE, AS WELL AS A BACK HAVING A SLOT ADAPTED TO RECEIVE THE TOOL, AND TIMEPIECE EQUIPPED WITH SUCH A BACK

(71) Applicant: Omega SA, Biel/Bienne (CH)

(72) Inventor: Philippe Loetscher, Evilard (CH)

(73) Assignee: Omega SA, Biel/Bienne (CH)

( * ) Notice: Subject to any disclaimer, the term of this patent is extended or adjusted under 35 U.S.C. 154(b) by 912 days.

(21) Appl. No.: 17/379,375

(22) Filed: Jul. 19, 2021

(65) Prior Publication Data

US 2022/0083010 A1 Mar. 17, 2022

(30) Foreign Application Priority Data

Sep. 16, 2020 (EP) .................................... 20196483

(51) Int. Cl.
*G04D 1/10* (2006.01)
*G04B 37/00* (2006.01)

(52) U.S. Cl.
CPC ............... *G04D 1/10* (2013.01); *G04B 37/00* (2013.01)

(58) Field of Classification Search
CPC .......... G04D 1/10; G04B 37/00; G04B 37/11; G04B 37/12
See application file for complete search history.

(56) References Cited

U.S. PATENT DOCUMENTS 251,183 A * 12/1881 Bullock ................... G04D 1/10 29/232
4,121,485 A * 10/1978 Braun ...................... G04D 1/10 81/125

(Continued)

FOREIGN PATENT DOCUMENTS

CH 26 064 A4 3/1966
CN 105388744 A 3/2016

(Continued)

OTHER PUBLICATIONS

European Search Report issued Feb. 24, 2021 in European Application 20196483.0, filed on Sep. 16, 2020 (with English Translation of Categories of cited documents), 3 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A timepiece and a tool to separate a back from a middle, which jointly delimit a watch case of this timepiece, inside which a horological movement is housed, this tool having the appearance of a wedge, i.e. an acute-shaped part formed by a first face and a second face which intersect at an angle of less than 90° and which are connected to one another by a rounded portion, the first face of the tool being oriented such that it extends parallel to a mean plane wherein the horological movement is located when an horologist engages this tool between the back and the middle in order to separate this back from this middle, the rounded portion being connected to the second face by a curved portion, the curvature whereof is directed towards the inside of a surface delimited by the first and second faces.

3 Claims, 2 Drawing Sheets

(56) References Cited

U.S. PATENT DOCUMENTS

| | | | | |
|---|---|---|---|---|
| 4,135,416 | A * | 1/1979 | Roux | B25B 7/02 81/421 |
| 5,388,082 | A * | 2/1995 | Chou | G04D 1/10 368/327 |
| 2003/0167880 | A1 * | 9/2003 | Yamakawa | G04D 3/0066 81/6 |
| 2009/0127521 | A1 | 5/2009 | Foley | |
| 2016/0062316 | A1 | 3/2016 | Maruyama | |
| 2019/0369567 | A1 | 12/2019 | Reiling et al. | |
| 2022/0083007 | A1 * | 3/2022 | Matsumoto | G04B 19/283 |

FOREIGN PATENT DOCUMENTS

| | | | |
|---|---|---|---|
| JP | 58-151882 | U | 10/1983 |
| TW | 285300 | | 9/1996 |
| TW | I657321 | B | 4/2019 |
| WO | WO 03/081345 | A1 | 10/2003 |

OTHER PUBLICATIONS

Combined Chinese Office Action & Search Report issued Jul. 5, 2024 in Chinese Application No. 202111087033.0 (with English translation of Category of Cited Documents), 9 pgs.

Indian Office Action issued Dec. 23, 2021 in Indian Patent Application No. 110122889, 7 pages.

* cited by examiner

TOOL FOR SEPARATING A BACK FROM A MIDDLE OF A TIMEPIECE, AS WELL AS A BACK HAVING A SLOT ADAPTED TO RECEIVE THE TOOL, AND TIMEPIECE EQUIPPED WITH SUCH A BACK

CROSS-REFERENCE TO RELATED APPLICATION

This application claims priority to European Patent Application No. 20196483.0 filed on Sep. 16, 2020, the entire disclosure of which is hereby incorporated herein by reference.

TECHNICAL FIELD OF THE INVENTION

The present invention relates to a tool intended to assist a horologist in separating a back from a middle of a timepiece, as well as to such a back having a slot adapted to receive the tool and to a timepiece equipped with such a back.

BACKGROUND OF THE INVENTION

When a watch is returned to the factory, for example for servicing or repair, the back of this watch must be opened. However, the operation consisting of opening the back of a watch case is always delicate and requires a great deal of care from the horologist performing such an intervention. The category of backs to which the present invention relates is that including backs mounted on the middle by interlocking with the insertion of a gasket between the back and the middle. To allow them to be opened, such backs conventionally have a slot at a point on the outer peripheral edge thereof which allows the horologist to insert a tool between this back and the middle to which this back is attached. In order to then separate the back from the middle, two possible techniques exist: either the horologist engages the tool inside the slot and rotates it about itself, so that the back can be gradually separated from the middle by leverage; or the horologist pushes the tool forwards several times and gradually engages it between the back and the middle, thus using the tool like a wedge to separate the back from the middle. Regardless of the technique chosen by the horologist to separate the back from the middle, and despite all the care taken by the horologist when carrying out this operation, the back often emerges marked as a result of the dismantling operation. More specifically, at present, the slot made on the back to allow the tool to be engaged and the back to be separated from the middle is arranged such that, very often, when the tool is engaged, it damages the outer peripheral edge of the back and leaves a mark that is clearly visible to the naked eye once the back has been reassembled. It goes without saying that a horologist cannot return a watch that has been damaged to its owner after servicing. As a result, when this type of problem arises, either the back must be reworked in order to make the mark disappear—this operation is known as "repairing" in the watchmaking field—or the back must be replaced. In both cases, this leads to additional costs that, of course, cannot be charged to the owner of the watch. This problem will be better understood upon examining FIG. 1 accompanying the present patent application, which is a partial, sectional view of a watch case in the region where a slot is provided in accordance with the prior art, enabling a horologist to insert a tool with which to separate the back from the middle. Designated as a whole by the general reference numeral 1, the watch case comprises a middle 2 at the base whereof a back 4 is interlocked with the insertion of a gasket 6 between this back 4 and this middle 2. At one point on the perimeter thereof, the back 4 has a slot 8 which frees a space 10 between this back 4 and the middle 2, allowing the horologist to engage the end of a tool 12 with which the horologist will exert leverage on the back 4 to separate this back 4 from the middle 2.

In the description hereinbelow, a plane or a surface will be referred to as "horizontal" when this plane or this surface extends in a plane parallel to the mean plane P in which a horological movement 14 that is housed in the watch case 1 extends. The term "mean" plane P is used only because the horological movement 14 has a thickness that cannot be reduced to a single plane. As can be seen from FIG. 1, the tool 12 has the appearance of a wedge, i.e. an acute-shaped part formed by a first face 12*a* and a second face 12*b* which intersect at an angle $\alpha$ of less than 90° and which are connected to one another by a rounded portion 12*c*. The slot 8 made in the back 4 takes on the form of a surface 8*a* which is inclined relative to the horizontal when the back 4 is attached to the middle 2. This inclined surface 8*a* extends away from the middle 2 towards the bottom thereof and is extended by a rounded portion 8*b* procuring the connection between the inclined surface 8*a* and a bottom surface 16 of the back 4. As can be seen from FIG. 1, the rounded portion 8*b* forms an outer edge 18 of the back 4.

FIG. 1 shows that, in order to separate the back 4 from the middle 2, the tool 12 is engaged inside the slot 8 and oriented such that the first face 12*a* thereof extends horizontally, i.e. parallel to the mean plane P in which the horological movement 14 extends. This FIG. 1 further shows that when the horologist engages the tool 12 inside the space 10 freed between the middle 2 and the back 4 by the slot 8, the tool 12 comes to bear on the outer edge 18 of the back 4 via the second face 12*b* thereof. As a result, if, in order to separate the back 4 from the middle 2, the horologist is required to exert a slightly excessive leverage using the tool 12, he could damage the outer edge 18 of the back 4 and leave a clearly visible mark 19 in the area where the tool 12 comes to bear on the outer edge 18 of the back 4. It goes without saying that the horologist will not be able to return the watch to its owner in this condition and will either have to re-work the back 4 to make the mark 19 disappear or procure a new back to replace the damaged back. In both cases, this represents a loss of time and money for the watchmaker.

SUMMARY OF THE INVENTION

The purpose of the present invention is to provide a tool and a new arrangement for a back of a watch case which guarantees that, in the event that the back is marked by the tool when the horologist separates the back from the middle of the watch case, this mark will not be perceptible to the owner of the watch.

For this purpose, the present invention relates to a timepiece and to a tool intended to be used by a horologist to separate a back from a middle, which jointly delimit a watch case of this timepiece, inside which a horological movement is housed, this tool having the appearance of a wedge, i.e. an acute-shaped part formed by a first face and a second face which intersect at an angle $\alpha$ of less than 90° and which are connected to one another by a rounded portion, the first face of the tool being oriented such that it extends parallel to a mean plane in which the horological movement is located when the horologist engages this tool between the back and the middle in order to separate this back from this middle, the rounded portion being connected to the second face by a curved portion, the curvature whereof is directed towards the inside of a surface delimited by the first and second faces, the back of the timepiece being delimited externally by a perimeter, at at least one point whereof a slot is provided which frees, between this back and the middle, a space allowing the horologist to engage the end of the tool by means whereof the horologist will exert leverage on the back in order to separate this back from the middle, this slot comprising a surface inclined at an acute angle relative to the mean plane when the back is fixed to the middle, this inclined surface extending away from the middle towards the bottom thereof and being extended by a rounded portion procuring the connection between the inclined surface and a bottom surface of the back, the angle between the first face and the second face of the tool being less than the acute angle formed by the second inclined surface with the mean plane.

The present invention further relates to a tool intended to be used by a horologist to separate a back from a middle which jointly delimit a watch case of a timepiece inside which a horological movement is housed, this tool having the appearance of a wedge, i.e. an acute-shaped part formed by a first face and a second face which intersect at an angle of less than 90° and which are connected to one another by a rounded portion, the first face of the tool being oriented such that it extends parallel to a mean plane in which the horological movement is located when the horologist engages this tool between the back and the middle in order to separate this back from this middle, the rounded portion being connected to the second face by a curved portion, the curvature whereof is directed towards the inside of a surface delimited by the first and second faces.

The present invention further relates to a timepiece comprising a watch case, inside which is housed a horological movement which extends in a mean plane, the watch case being delimited by a middle closed at a base by a back, the back being delimited externally by a perimeter at at least one point on which a slot is provided which frees, between this back and the middle, a space allowing the horologist to engage the end of a tool by means whereof the horologist will exert leverage on the back to separate this back from the middle, this slot comprising a surface inclined at an acute angle relative to the mean plane when the back is fixed to the middle, this inclined surface extending away from the middle towards the bottom thereof and being extended by a rounded portion procuring the connection between the inclined surface and a bottom surface of the back.

BRIEF DESCRIPTION OF THE FIGURES

Other features and advantages of the present invention will more clearly emerge upon reading the following detailed description of one example embodiment of a tool intended to allow a horologist to separate a back from a middle of a timepiece, this example being provided for the purposes of illustration only and not intended to limit the scope of the invention, given with reference to the accompanying drawing, wherein.

DETAILED DESCRIPTION OF ONE EMBODIMENT OF THE INVENTION

The present invention proceeds from the general inventive idea consisting of providing horologists with a tool allowing them to separate the back from a middle of a watch case without leaving a mark visible to the owner of the watch on the back after the back has been reassembled on the middle. The present invention further relates to a watch case back having a slot, the profile whereof is arranged such that if, despite all the care taken by the horologist when separating the back from the middle of the watch case, the back emerges marked by this removal operation, the mark left by the tool on the back will not be visible to the owner of the watch once the back has been reassembled on the middle.

Figure 1:
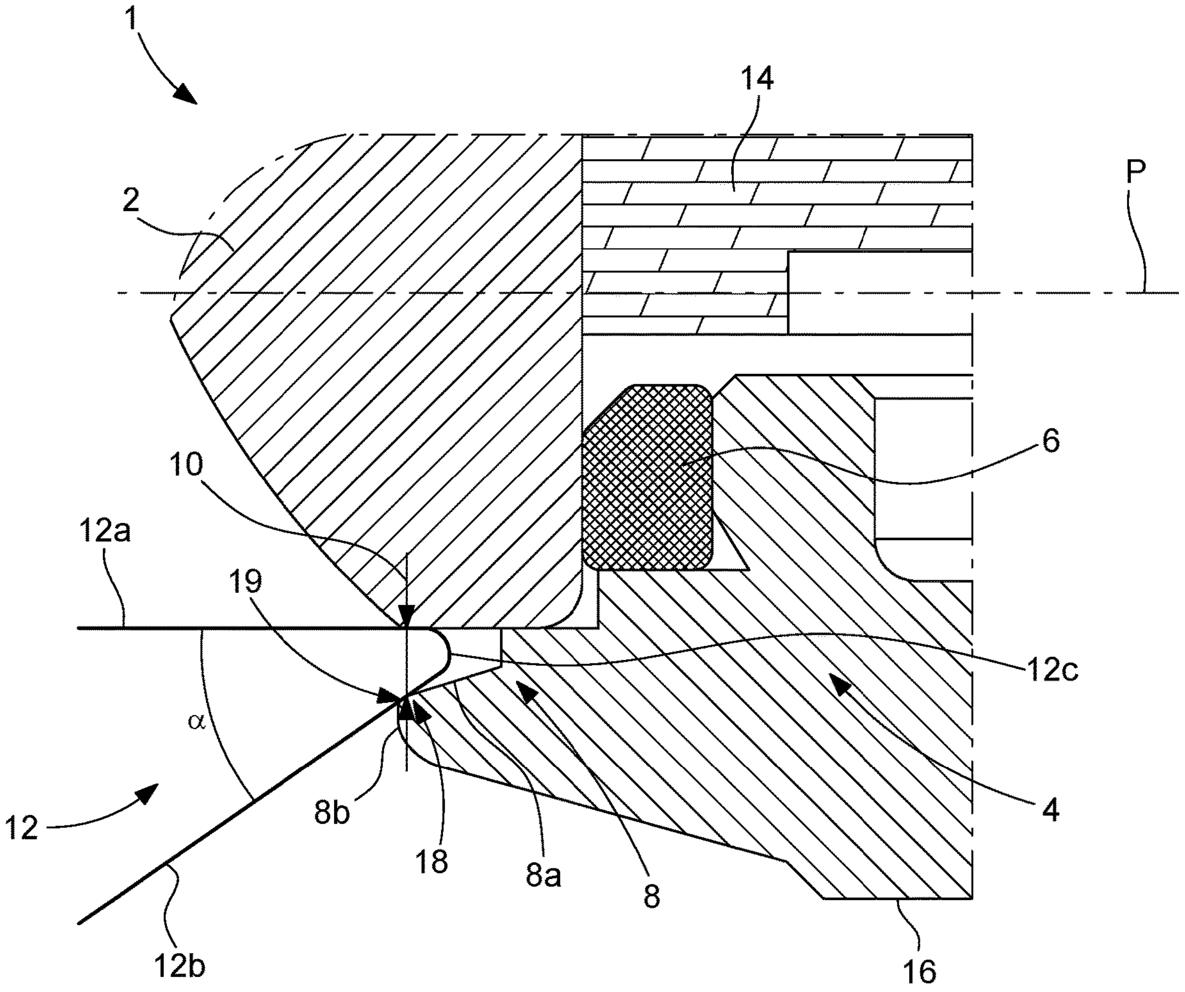
FIG. 1, already mentioned, is a partial, sectional view of a watch case of the prior art in the region where a slot is provided enabling a horologist to insert a tool with which to separate the back from the middle.
Figure 2A:
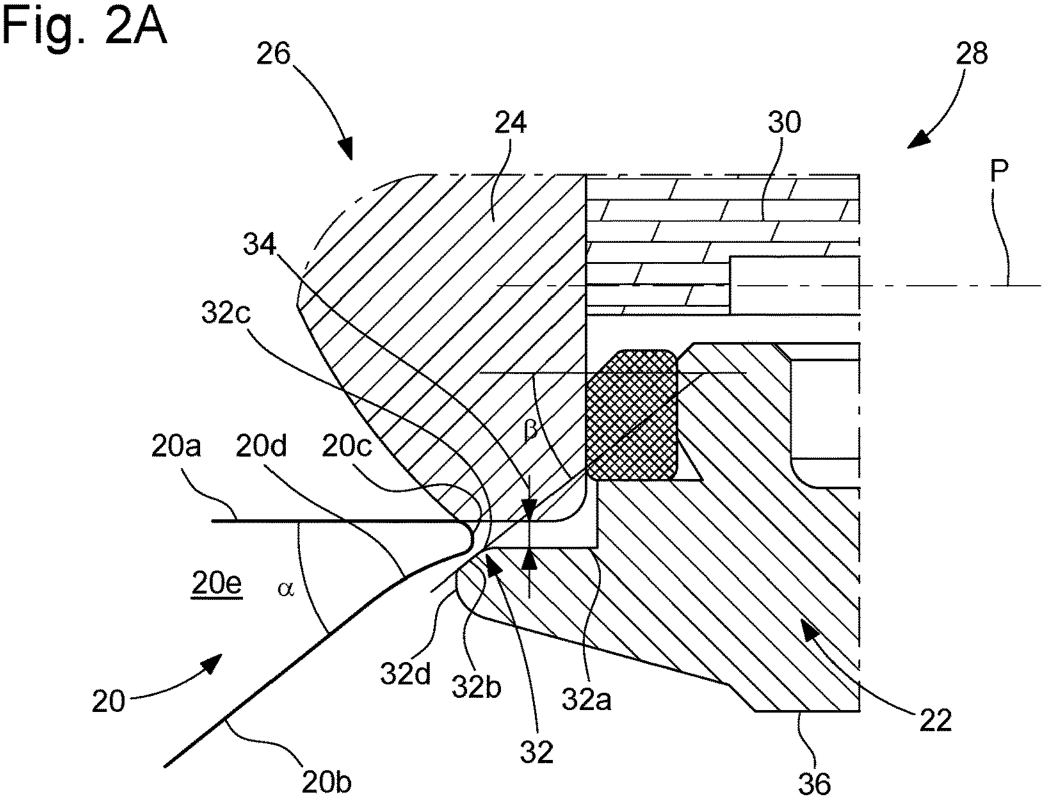
FIG. 2A is a partial, sectional view of a watch case showing the engagement of a tool according to the invention inside the space between the middle and the back of the watch case freed by a slot made in this back.
Figure 2B:
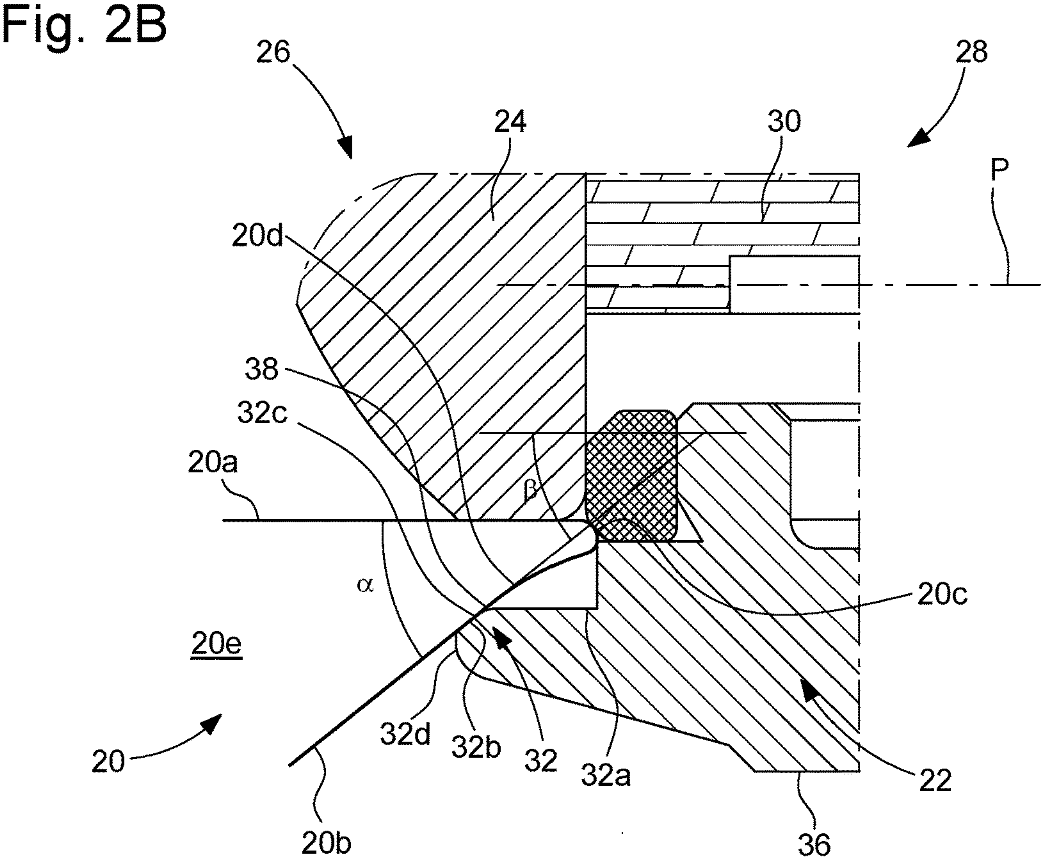
FIG. 2B is a view similar to that of FIG. 2A when the back has been separated from the middle of the watch case.

As shown in FIG. 2A, a tool 20 according to the invention has the appearance of a wedge, i.e. an acute-shaped part formed by a first face 20*a* and a second face 20*b* which intersect at an angle $\underline{\alpha}$ of less than 90° and which are connected to one another by a rounded portion 20*c*. More specifically, the rounded portion 20*c* is connected to the second face 20*b* of the tool 20 by a curved portion 20*d*, the curvature whereof is directed towards the inside of a surface 20*e* of the tool 20 delimited by the first and second faces 20*a*, 20*b*.

As will be better understood from the description hereinbelow, the tool 20 is intended to be used by a horologist to separate a back 22 from a middle 24, which jointly delimit a watch case 26 of a timepiece 28, inside which a horological movement 30 is housed. More specifically, the first face 20*a* of the tool 20 is arranged such that, when the horologist engages the tool 20 between the back 22 and the middle 24 in order to separate this back 22 from this middle 24, this first face 20*a* extends parallel to a mean plane $\underline{P}$ in which the horological movement 30 is located.

Still according to the invention, the back 22 of the timepiece 28 is delimited externally by a perimeter at at least one point whereon a slot 32 is made, which frees a space 34 between this back 22 and the middle 24, allowing the horologist to engage the end of the tool 20 with which the horologist will exert leverage on the back 22 to separate this back 22 from the middle 24. In order to allow the tool 20 to be engaged, the slot 32 comprises a first planar surface 32*a* parallel to the mean plane $\underline{P}$ in which the horological movement 30 extends, this first planar surface 32*a* being extended, via a first rounded portion 32*c*, by a second inclined planar surface 32*b* which forms an acute angle $\underline{\beta}$ with the mean plane $\underline{P}$ when the back 22 is fixed to the middle 24. This second inclined planar surface 32*b* extends away from the middle 24 towards the bottom thereof and is extended by a portion 32*d*, that is for example rounded, procuring the connection between the second inclined planar surface 32*b* and a bottom surface 36 of the back 22.

In order to facilitate the engagement of the tool 20 inside the slot 32, the angle $\underline{\alpha}$ between the first face 20*a* and the second face 20*b* of the tool 20 is less than the acute angle $\underline{\beta}$ formed by the second inclined surface 32*b* with the mean plane $\underline{P}$, which allows the tool 20 to come to bear, via the curved portion 20*d* thereof, in an area 38 of the first rounded portion 32*c* of the slot 32 that will not be perceptible to the owner of the timepiece 28 once the back 22 has been reattached to the middle 24. As a result, even if the area 38 is marked by the operation for separating the back 22 from the middle 24, this mark will no longer be visible when the back 22 is reassembled.

It goes without saying that the present invention is not limited to the embodiment described above and that various simple alternatives and modifications can be considered by a person skilled in the art without leaving the scope of the invention as defined by the accompanying claims.

NOMENCLATURE

1. Watch case
2. Middle
4. Back
6. Gasket
8. Slot
8*a*. Inclined surface
8*b*. Rounded portion
10. Space
12. Tool
12*a*. First face
12*b*. Second face
12*c*. Rounded portion
14. Horological movement
16. Bottom surface
18. Outer edge
P. Mean plane
α. Angle of less than 90°
19. Mark
20. Tool
20*a*. First face
20*b*. Second face
20*c*. Rounded portion
20*d*. Curved portion
20*e*. Surface
22. Back
24. Middle
26. Watch case
28. Timepiece
30. Horological movement
32. Slot
32*a*. First planar surface
32*b*. Second inclined planar surface
32*c*. First rounded portion
32*d*. Second rounded portion
34. Space
36. Bottom surface
38. Area
P. Mean plane
α. Angle of less than 90°
β. Acute angle

The invention claimed is:

1. A system comprising:
a timepiece; and
a tool intended to be used by a horologist to separate a back from a middle, which jointly delimit a watch case of said timepiece, inside which a horological movement is housed,
said tool presenting a shape of a wedge including an acute-shaped part formed by a first face and a second face which intersect at an angle of less than 90° and which are connected to one another by a rounded portion,
the first face of the tool being arranged such that the first face of the tool extends parallel to a mean plane wherein the horological movement is located when the horologist engages said tool between the back and the middle in order to separate said back from said middle,
the rounded portion being connected to the second face by a curved portion, a curvature of the curved portion being directed towards an inside of a surface delimited by the first and second faces,
the back of the timepiece being delimited externally by a perimeter, a portion of the perimeter including a slot which frees, between said back and the middle, a space configured to engage an end of the tool,
said slot comprising a first planar surface parallel to the mean plane wherein the horological movement extends,
said first planar surface being extended by a second inclined planar surface which forms, with the mean plane, an acute angle when the back is fixed to the middle, said second inclined planar surface extending away from the middle towards a bottom of the middle,
the angle between the first face and the second face of the tool being less than the acute angle formed by the second inclined surface with the mean plane, and
a gasket being disposed between the back and the middle, a bottom surface of the gasket abutting a shoulder provided on the back, a first side surface of the gasket abutting a surface of the back, a second side surface of the gasket abutting a surface of the middle, and a top surface of the gasket directly facing the horological movement.

2. A tool intended to be used by a horologist to separate a back from a middle which jointly delimit a watch case of a timepiece inside which a horological movement is housed,
said tool having the appearance of presenting a shape of a wedge including an acute-shaped part formed by a first face and a second face which intersect at an angle of less than 90° and which are connected to one another by a rounded portion,
the first face of the tool being oriented such that the first face of the tool extends parallel to a mean plane wherein the horological movement is located when the horologist engages said tool between the back and the middle in order to separate said back from said middle, and
the rounded portion being connected to the second face by a curved portion, a curvature of the curved portion being directed towards an inside of a surface delimited by the first and second faces.

3. A timepiece comprising:
a watch case, inside which is housed a horological movement which extends in a mean plane, the watch case being delimited by a middle closed at a base by a back,
the back being delimited externally by a perimeter, a portion of the perimeter including a slot which frees, between said back and the middle, a space configured to engage an end of a tool,
said slot comprising a first planar surface parallel to the mean plane wherein the horological movement extends,
said first planar surface being extended by a second inclined planar surface which forms, with the mean plane, an acute angle when the back is fixed to the middle, said second inclined planar surface extending away from the middle towards a bottom of the middle, and
a gasket being disposed between the back and the middle, a bottom surface of the gasket abutting a shoulder provided on the back, a first side surface of the gasket abutting a surface of the back, a second side surface of the gasket abutting a surface of the middle, and a top surface of the gasket directly facing the horological movement.

* * * * *